(12) United States Patent
Norberg

(10) Patent No.: US 6,592,378 B2
(45) Date of Patent: Jul. 15, 2003

(54) METHOD AND SYSTEM FOR RESPONSE TO ONSET OF STROKE

(76) Inventor: William J. Norberg, 142 Graham St., SE., Port Charlotte, FL (US) 33952

(*) Notice: Subject to any disclaimer, the term of this patent is extended or adjusted under 35 U.S.C. 154(b) by 0 days.

(21) Appl. No.: 09/833,195

(22) Filed: Apr. 12, 2001

(65) Prior Publication Data

US 2002/0172929 A1 Nov. 21, 2002

(51) Int. Cl.[7] .............................................. G09B 23/28
(52) U.S. Cl. ....................................... 434/262; 206/232
(58) Field of Search ................................ 434/262, 265, 434/272, 275; 600/300; 206/570, 438

(56) References Cited

U.S. PATENT DOCUMENTS

| | | | | |
|---|---|---|---|---|
| 3,958,690 A | * | 5/1976 | Gee | 206/232 |
| 4,890,741 A | * | 1/1990 | Edelstein | 206/534 |
| RE35,445 E | * | 2/1997 | Pora | 206/532 |
| 5,779,122 A | * | 7/1998 | Martinelli | 224/683 |
| 5,833,330 A | * | 11/1998 | Kos | 312/209 |
| 5,850,919 A | * | 12/1998 | Freed | 206/534 |
| 6,112,961 A | * | 9/2000 | Phillips | 224/222 |

OTHER PUBLICATIONS

Scott & White, "Stroke Risks in Older Adults", 1999.*
"NIH Stroke Scale", Mar. 1993.*
Office of Research and Development, HSR&D, Program Announcement: Stroke, "Investigator Initiated Research: Priorities in Stroke Prevention Management", Dec. 1999.*
Kennedy, T. "Stroke: Putting Assessment and Primary Prevention Strategies into Practice", The Internet Journal of Advanced Nursing Practive 1999 vol. 2N2.*

* cited by examiner

*Primary Examiner*—Derris H. Banks
*Assistant Examiner*—Kurt Fernstrom
(74) *Attorney, Agent, or Firm*—Frank A. Lukasik

(57) ABSTRACT

The invention is a medical program providing general information for self-recognition and treatment of an acute stroke and directions to access emergency services. The instructions and medication are held in a transparent plastic pouch containing two depressions for holding medication. The instructions include identifying signs and symptoms of stroke onset, instructions for taking medication, instructions for requesting an evaluation by emergency medical service personnel and a test for stroke likelihood.

1 Claim, 7 Drawing Sheets

AM I HAVING A STROKE?
TEST TO DETERMINE LIKELIHOOD OF STROKE (Person other than stroke victim to complete)(Use pen or pencil and circle the appropriate "YES"/"NO" answer. Add up the points to the right for the "total score")

1. ASK PERSON WHERE THEY ARE – DO THEY KNOW?　　YES=0　NO=1
   (ALERTNESS/COGNITIVE FUNCTION)
2. ASK PERSON THE MONTH, YEAR AND THEIR AGE –　　YES=0　NO=1
   DO THEY GIVE CORRECT ANSWERS?
   (ALERTNESS/COGNITIVE FUNCTION)
3. ASK PERSON TO SMILE AND SHOW TEETH – DO　　YES=0　NO=1
   BOTH SIDES OF FACE MOVE EQUALLY?
   (ALERTNESS/COGNITIVE FUNCTION)
4. ASK PERSON TO RAISE BOTH ARMS – DO BOTH　　YES=0　NO=1
   ARMS RAISE AT THE SAME SPEED WITH SAME EFFORT?
   (MOTOR SKILLS)
5. ASK PERSON TO WALK – DOES PERSON WORK AS　　YES=0　NO=1
   THEY NORMALLY DO WITH USUAL BALANCE AND STANCE?
   (MOTOR SKILLS)
6. POINT TO YOUR SHIRT AND ASK THE PERSON "WHAT　　YES=0　NO=1
   IS THIS PIECE OF CALLED?" DOES THE PERSON IDENTIFY
   THE ITEM CORRECTLY AND IN AN APPROPRIATE TIME?
   (COGNITIVE FUNCTION)
7. REPEAT STEP FIVE WITH A DIFFERENT ARTICLE OF　　YES=0　NO=1
   CLOTHING – CORRECT ANSWER IN AN APPROPRIATE TIME
   (COGNITIVE FUNCTION)
8. ASK PERSON TO SAY "EVERY GOOD BOY DESERVES　　YES=0　NO=1
   FUDGE" IS SPEECH NORMAL AND WITHOUT SLURRING?
   (COGNITIVE FUNCTION/MOTOR SKILLS)　TOTAL SCORE:_____

IF "TOTAL SCORE" IS LESS THAN FOUR, STOP. <u>DO NOT CONTINUE WITH EVALUATION</u> – AWAIT EMERGENCY PERSONNEL OR SEEK IMMEDIATE MEDICAL TREATMENT. STILL HIGH POSSIBILITY OF STROKE.

IF "TOTAL SCORE" IS GREATER THAN FOUR THE PERSON IS PROBABLY HAVING A STROKE. <u>DO NOT USE MEDICATION YET</u>. CONTINUE WITH NEXT STEP TO DETERMINE IF PERSON SHOULD USE MEDICATION.

FIG. 3

Stop Stroke Program

Signs & Symptoms of a Stroke:
New Onset of: Trouble seeing,
Or Trouble walking or Balance
Or Trouble Speaking or Confusion
Or Numbness in arms or legs
Or Seizure or Headache (new & different)
Seek Medical Attention CALL 911 NOW
Open package for Medication and Instructions

— 601

Medications: Do not take if you have:
1. New, different severe headache.
2. Recent head injury
3. Loss of consciousness
4. Seizure Take Medications: For signs of stroke
Take medications to decrease blood clotting.
(If pills are broken take anyway, chew or swallow)

Go to the Hospital Emergency Department now

— 602

REQUEST IMMEDIATE EVALUATION
Tell EMS: "I am having a Stroke."
Request: "Rapid evaluation or transfer to a Stroke Center." Know exact time of Stroke onset.
Thrombolytic therapy must be given within three hours of onset of Stroke.
All medical decisions will be made by the Attending Physicians who are directly caring for you in the Emergency Facility.

— 603

Keep this with you at all times!
Test for stroke likelihood.
Perform by yourself or by another
1. Do you know where you are?
2. Does your face ove equally?
3. Is your speech blurred?
4. Can you raise both arms?
5. Can you walk normally?
6. Can you identify objects?
   I am having a Stroke CALL 911

METHOD AND SYSTEM FOR RESPONSE TO ONSET OF STROKE

BACKGROUND OF THE INVENTION

1. Field of the Invention

The invention relates generally to strokes and more particularly to a method and system for providing specific medical information, self-diagnostic tests, prescription medication, and quality assurance for providing pre-need, and response to the onset of a stroke. In addition, the method and system of the invention is adaptable to other medical illnesses benefiting from early pharmaceutical intervention.

2. Prior Art

Stroke is the third leading cause of death and the leading cause of adult disability in the United states. Of the approximately 730,000 strokes that occur every year in the United States, 85% are ischemic strokes. Thrombolysis, the use of medication to dissolve blood clots, is the only proven therapy for acute ischemic stroke (AIS). However, successful thrombolytic therapy for ischemic stroke is extremely time-dependent. As the use of thrombolytic therapy for acute stroke increases, emergency medical service including, air medical teams, increasingly become involved in its timely implementation. To maximize the outcome of these patients, medical personnel must understand the theory and practice of thrombolysis for AIS.

AIS is usually caused by the occlusion of a cerebral artery by clot. Animal studies have demonstrated that temporary occlusion of a cerebral artery produces varying degrees of deficit based on the occlusion's length of time. These studies demonstrated that occlusions of less than 2 hours produced little or no deficit, but occlusion lasting more than 6 hours produced severe deficits and had a significant incidence of hemorrhage into the infarction. These studies imply that opening an occluded artery with thrombolysis may allow salvage of compromised but viable neurons in an acute stroke. However, they also imply that outcome depends significantly on time.

It is desirable to provide a method for the immediate response to stroke onset. especially where the patient cannot receive medical care within a three-hour time window. Although the invention involves the screening of potential users by medical doctors, the related art does not address that process in detail. Rather, related art approaches describe the following: A process of helping patients assess their risk of stroke; determine means to reduce stroke risk; recognize stroke onset, assess stroke condition and evaluate use of medication; and guide patients to appropriate health care facility and request timely therapy. Medical conditions, as persons with heart attacks, and allergic reactions are also potential beneficiaries of this new invention.

For general background material, the following prior art is provided:

| | | |
|---|---|---|
| 6,053,864 | 04/2000 | Clawson |
| 6,010,451 | 01/2000 | Clawson |
| 6,004,266 | 12/1999 | Clawson |
| 5,989,187 | 11/1999 | Clawson |
| 5,857,966 | 01/1999 | Clawson |
| 5,554,031 | 09/1996 | Moir |
| 6,007,459 | 12/1999 | Burgess |

SUMMARY OF THE INVENTION

The instant invention relates to methods and systems for responding to the emergency medical condition of stroke. Specifically, this invention relates to the process of providing a medical review, providing instruction on reducing risk factors, instruction on identifying stroke onset, instruction to determine the probability of stroke onset, instruction on individual response protocols, the provision of prescription medication, and instruction to determine when medicinal use is appropriate.

The provision of immediate medical care following the onset of stroke presents several challenges to the victim and medical care providers. The primary challenge stems from the limited time window in which to minimize the devastating impacts of stroke. In short, the challenges include: the rapid treatment time required to minimize the debilitating impact of stroke; the proximity to the care provider; the time required for help to arrive and the time required for the victim to be transported to an appropriate care facility; the need for rapid identification of stroke symptoms; the need for rapid treatment of stroke; the limited nature of emergency response personnel resources; and the variances in training and education of emergency response personnel. This invention, in its best mode of operation, operates as part of a system for the management, processing, and response and treatment of the acute onset of stroke.

This invention accomplishes the above objectives by: First, gathering the necessary information from potential stroke victims and determining an eligible user population based on prior medical history, and eliminating those from consideration who present unreasonable risk factors. Second, by providing prescription medication, which may be used if the candidate remains eligible after stroke onset. Third by providing detailed instruction information on reducing lifestyle risks. Fourth by providing instructions on how to recognize stroke symptoms. Fifth, by providing instructions on how to respond when symptoms of stroke are present. Sixth, by providing instructions on how to determine whether the probability of stroke is low or high. Seventh, by providing detailed instructions on how to determine if the use of the prescribed medications is indicated. Eighth, by providing detailed instruction and information to be given to the emergency medical personnel upon arrival at the appropriate medical facility. Ninth, by providing detailed instructions on what diagnostic tests are to be requested and what treatment protocols are to be requested upon arrival at an appropriate medical care facility. When used correctly, this invention can improve stroke outcomes, decreases emergency medical response time, improves appropriate treatment rendered, provides a "zero time" emergency response through guidance provided to the victim. This invention is especially important as there is a direct correlation between delay to treatment and impairment, disability, and death. This invention provides a means for reducing the impairment, disability, and death caused by strokes.

It is desirable to provide for the recognition of stroke risk, identification of stroke factors, and instruction for the immediate appropriate response to stroke onset in systematic protocols to minimize delay in response time to stroke and maximize positive outcome from stroke, thus eliminating or minimizing the disability and death from stroke.

Accordingly, it is the primary objective of this invention to provide a system that is designed to improve time to stroke and improve medical outcomes.

Another object of this invention is to provide appropriate response protocols to the individual and medical provider to improve the quality, efficiency and appropriateness of the medical care delivered to the individual.

Still another object of this invention is to provide the individual with appropriate medication to minimize the impairment that results from delay to appropriate medical treatment.

A still further object of the invention is to provide a pouch device in which a patient may keep diagnostic information concerning stroke symptoms and medication for treatment of stroke.

These and other objects of this invention, which will be clear to those of ordinary skill in the art upon review of this patent specification and claims, are achieved by an invention which facilitates the prompt identification and response to stroke, by the provision of information, instruction, medication and protocols. The method and system of this invention is currently envisioned as a combination of written documentation or literature, flow-charts and medication.

BRIEF DESCRIPTION OF THE DRAWINGS

FIG. 3 is a diagrammatic depiction of the test used to determine the likelihood that the symptoms experienced are those of a stroke in accordance with the invention.

FIG. 7 is a plan view of instruction sheets contained within the pouch device of FIGS. 5 and 6.

DETAILED DESCRIPTION OF THE PREFERRED EMBODIMENTS

This invention provides a system and method for the rapid response to the onset of stroke by combining medical reviews, specific medical information, self diagnostic tests, instruction, and quality assurance to provide, pre-need, the resources necessary to reduce or eliminate impairment or death from stroke.

This invention includes a protocol process that may be employed by any person previously determined eligible to use the system by medical doctors.

This invention provides a system and method for the rapid response to the onset of stroke by combining medical review, specific medical information, self-diagnostic tests, instruction, and quality assurance to provide, pre-need, the resources necessary to reduce or eliminate impairment or death from stroke and includes a protocol process that may be employed by any person previously determined eligible to use the system by medical doctors.

Figure 1:
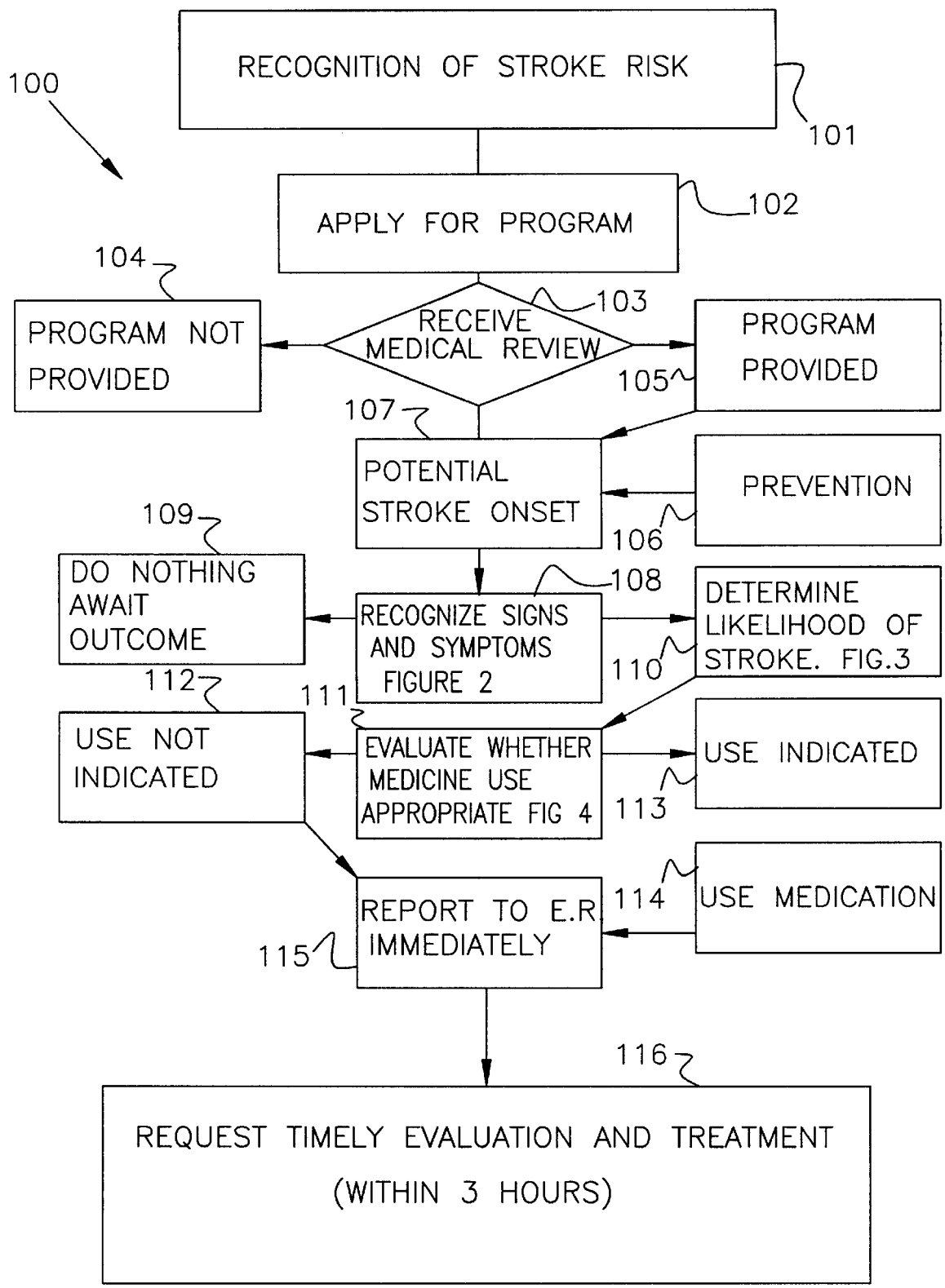
FIG. 1 diagrammatically depicts the principal elements of the system described in accordance with this invention.

FIG. 1 shows the complete system in which the system (designated overall by the numeral 100) operates in its best mode. The process of applying for the system through receipt of emergency medical care is overviewed in FIG. 1 Recognition of Stroke onset 101 indicates that the applicant must realize they are at some risk of stroke. This recognition may be based upon such things as family history, age, high risk categories such as high blood pressure or arteriosclerosis, high cholesterol, geographic stroke pre- disposition (stroke-belt). After a person realizes they are at risk they apply for the program 102 typically by telephoning a call center. At the call center the operator takes a detailed personal and medical history from the applicant which includes such things as age, prior hospitalization, family history, chronic illness, current medications, prior stroke, and various other specific risk factors. This critical information is forwarded to medical doctors 103 who review the information obtained from the call center and follow-up with the applicant if necessary. Based on the review of this information, the medical doctor determines if the applicant is eligible for the program. If the doctor determines the program presents an unreasonable risk the program is not provided 104. If the doctor determines, based on the information gathered from the applicant, that the program is suitable for use, and certain medication may be provided which is helpful, and the risk is acceptable, the program is provided 105. When the program is provided the applicant receives a detailed packet which contains, information on identifying high-risk factors, information on reducing risk factors, general information on stroke, information of common symptoms of stroke, instructions on how to identify and respond to potential stroke onset, instructions and a self-test to determine the probability of stroke, instructions on when to use the medications provided. After the applicant receives the program 105 the applicant should begin to employ the information and instruction on how to reduce risk and prevention 106. Prevention includes such things as stopping smoking, lowering cholesterol, controlling hypertension and monitoring blood-pressure, finding out if atrial fibrillation is present, eliminating heavy alcohol consumption, having a low sodium, low fat diet, evaluation for diabetes, close medical supervision of oral contraceptives, a regular exercise routine, and having medical evaluation of circulatory problems. However, despite being provided the program, a person may experience potential stroke onset 107 either before they implement prevention practices or despite implementing prevention practices. Potential stroke onset indicates that abnormal physical changes are occurring. The user will be aware of the potential stroke symptoms and be prepared to identify common symptoms 108 (see FIG. 2.—201) Those symptoms are: (202–207) sudden headache; seizure; numbness in arms or legs; trouble speaking or confusion; trouble seeing in one or both eyes; and trouble walking or with balance. If any are present the person is to call 911 immediately. Or, the person may, unwisely, choose to do nothing and await outcome 109. While awaiting emergency personnel arrival, or if no emergency service is available in the area, the person is to seek the assistance of a friend or neighbor to help in determining the likelihood of stroke 110 (see FIG. 3) If it is determined that there is not a high likelihood of stroke, use is not indicated 112. If it is determined that there is a high likelihood of stroke, the person should continue with the evaluation to evaluate whether the use of the medication is appropriate 111 (see FIG. 4.) Even though there may be a high likelihood of stroke, medicinal use may not be appropriate 112. If after evaluation 111/FIG. 4 use is indicated 113 the medication is taken 114. In either event, use indicated 114 or use not indicated 112 the person should report to an appropriate emergency medical care facility 115 and request immediate and timely evaluation and treatment (within three hours from onset).

Figure 2:
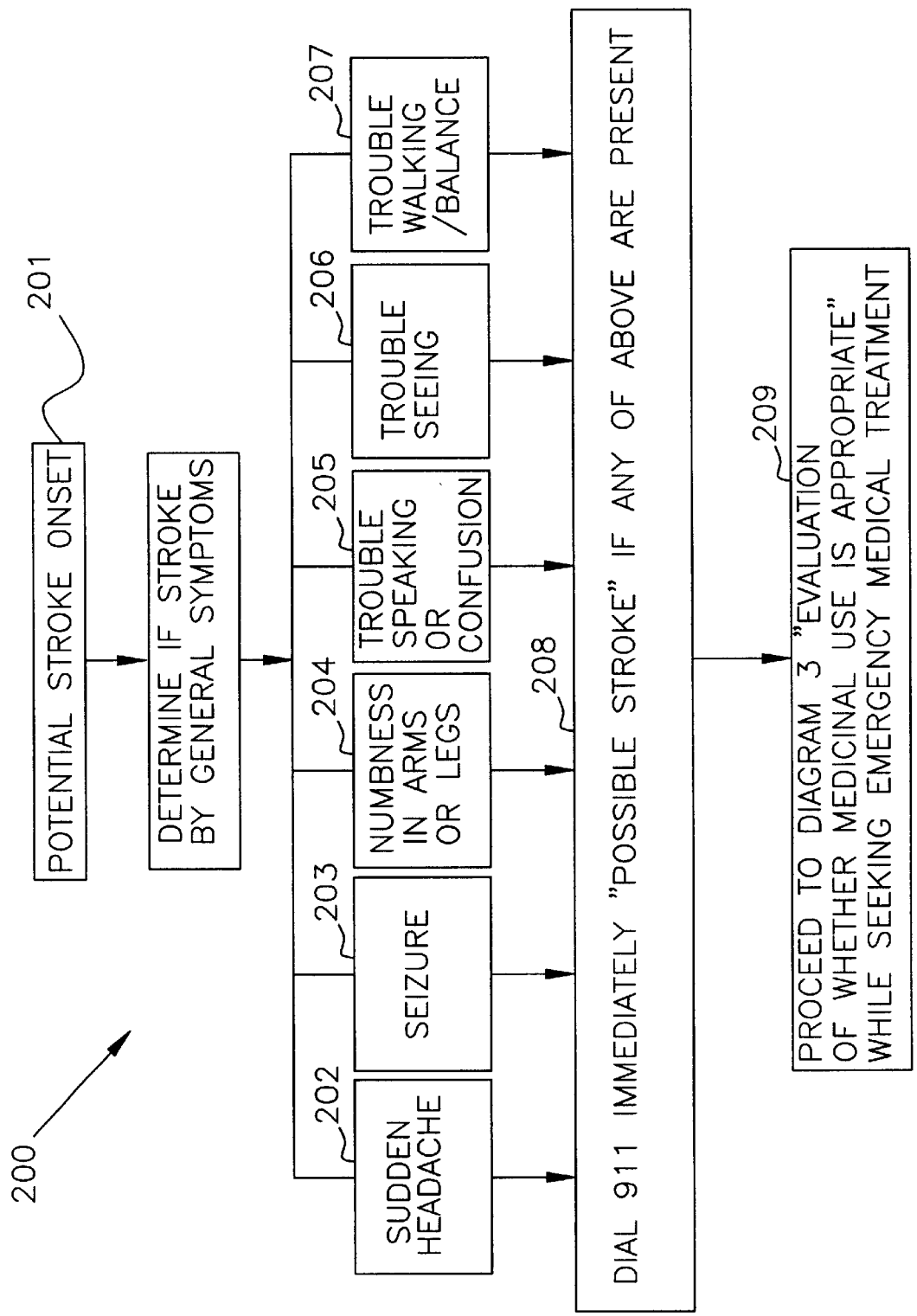
FIG. 2 is a flow chart of the potential symptoms and preferred and appropriate response to potential onset of a stroke.

FIG. 2. depicts the process for identifying the potential onset of stroke by itemizing the most common symptoms and indicating appropriate action to be taken following onset. Potential stroke onset is indicated by abnormal physical symptoms occurring. The user of the system will be aware of the general symptoms of stroke and upon occurrence of abnormal physical changes will consult appropriate materials provided to determine if these are symptoms of stroke. 201 Those symptoms are: sudden headache 202; seizure 203; numbness in arms or legs 204; trouble speaking or confusion 205; trouble seeing in one or both eyes 206; and trouble walking or with balance 207. If any of the above symptoms, 202–207, are present the person is to call 911 immediately 209. While awaiting emergency personnel they will proceed with the evaluation as set forth in FIG. 3. 301 FIG. 3. shows one potential model of a test to determine the likelihood or probability of stroke based on a combination of symptoms and physical impairments. A series of YES/NO questions or tests are provided with a point value for each. The points are combined to determine probability of stroke. Based on the score the person is either instructed to continue on to next step, (FIG. 4) 311, or to stop and seek medical care 312. This test is to be administered by someone other than the stroke victim 301. The questions or tests to be administered are:

Does person know where they are? 302

Does person know month, year, and their age? 303

When asked to smile and show teeth, do both sides of person's face move equally? 304

When asked to raise arms do both arms move at same speed and with same effort? 305

When asked to walk, can person walk as they normally do with usual balance and stance? 306

When asked about articles of clothing can person identify the article in an appropriate amount of time? 307

When asked to repeat phrase, can person do so with normal speech without slurring? 308 The YES/NO scores 309 are then added for the total points 310. If the total score is less than four (4), the person is instructed not to continue with the evaluation and not to take the medication provided If the total score is greater than four (4) the person is instructed to continue with the evaluation but not to take medication yet. 311

The person will continue with the evaluation 312.

Figure 4:
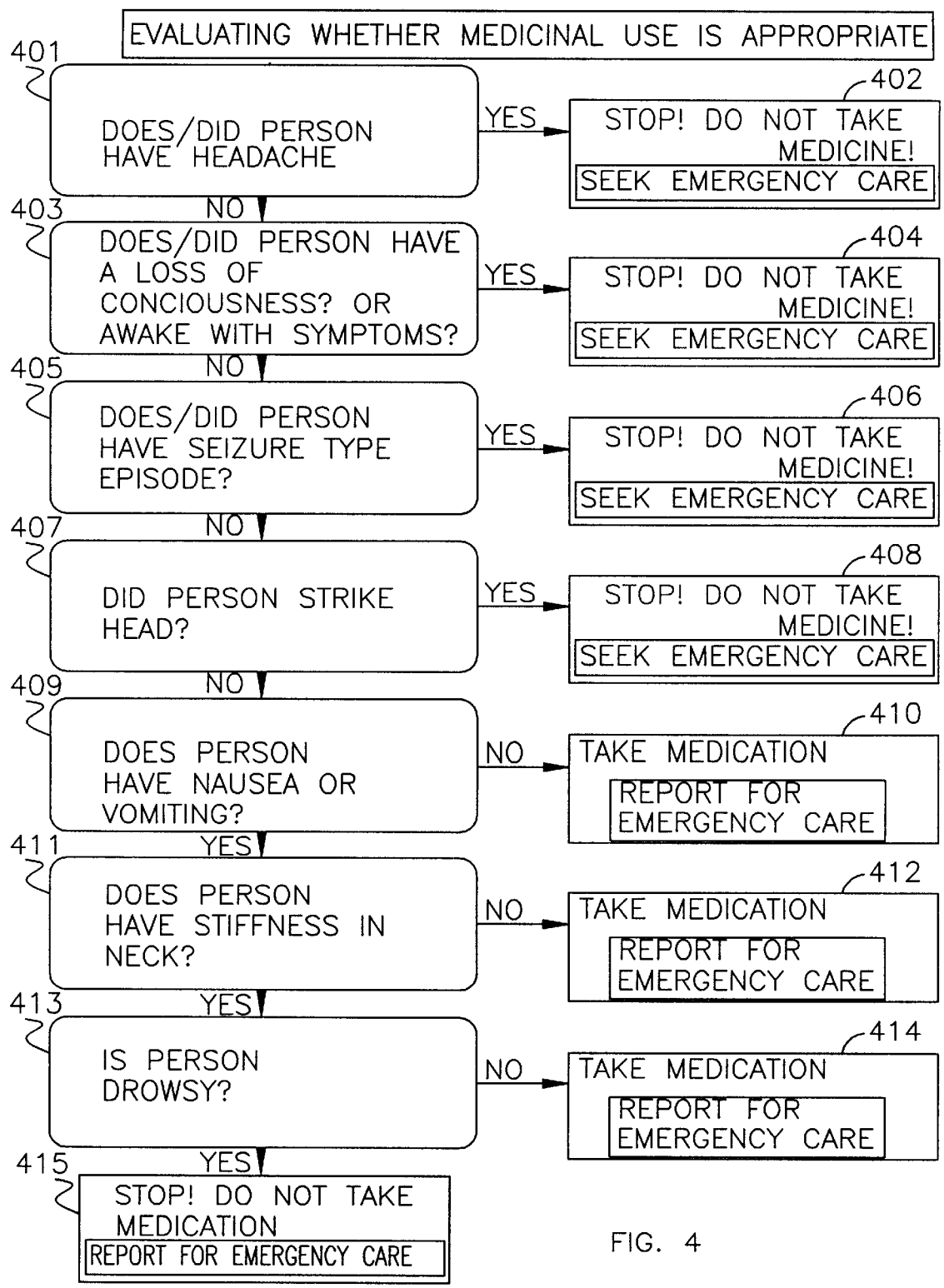
FIG. 4 is a flow chart depicting the steps taken to determine whether medicinal use is appropriate.

FIG. 4 depicts the preferred embodiment of the flow chart to determine if medicinal use is appropriate. Medicinal use is contingent upon presentation of symptoms of stroke and indication that the probability of stroke is high as well as appropriate indication after following flow chart. The person is queried about a multitude of symptoms which may or may not indicate use. The person is asked whether they had or have a headache?

401. If yes, use is not indicated

402. If no, they proceed to

403, Does I did person have a loss of consciousness or awaken with symptoms?

403. If yes, use is not indicated

404. If no, they proceed to

405, Does I Did person have seizure type episode?

405. If yes, use is not indicated

406. If no, they proceed to

407, Did person strike head?

407. If yes, use is not indicated

408. If no, they continue to

409, Does person have nausea or vomiting?

409. If no, the person is instructed to take the medication and report for immediate emergency medical treatment.

410. If yes, the person 15 instructed to continue to

411, Does person have stiffness in neck?

411. If no, the person is instructed to take medication and report for immediate emergency medical treatment.

412. If yes, the person is instructed to continue on.

413. Is person drowsy?

413. If no, the person is instructed to take medication and report for immediate emergency medical treatment.

414. If no, person is instructed to take medication and report for immediate emergency medical treatment.

414. If yes, person is instructed not to take medication and report immediate emergency medical treatment.

415. Regardless of whether medicinal use is indicated the person is to report as soon as possible to an appropriate care facility and request timely evaluation. Treatment protocols will be provided to the physician which outline treatment methods and indicate appropriate diagnostic tests.

Figure 5:
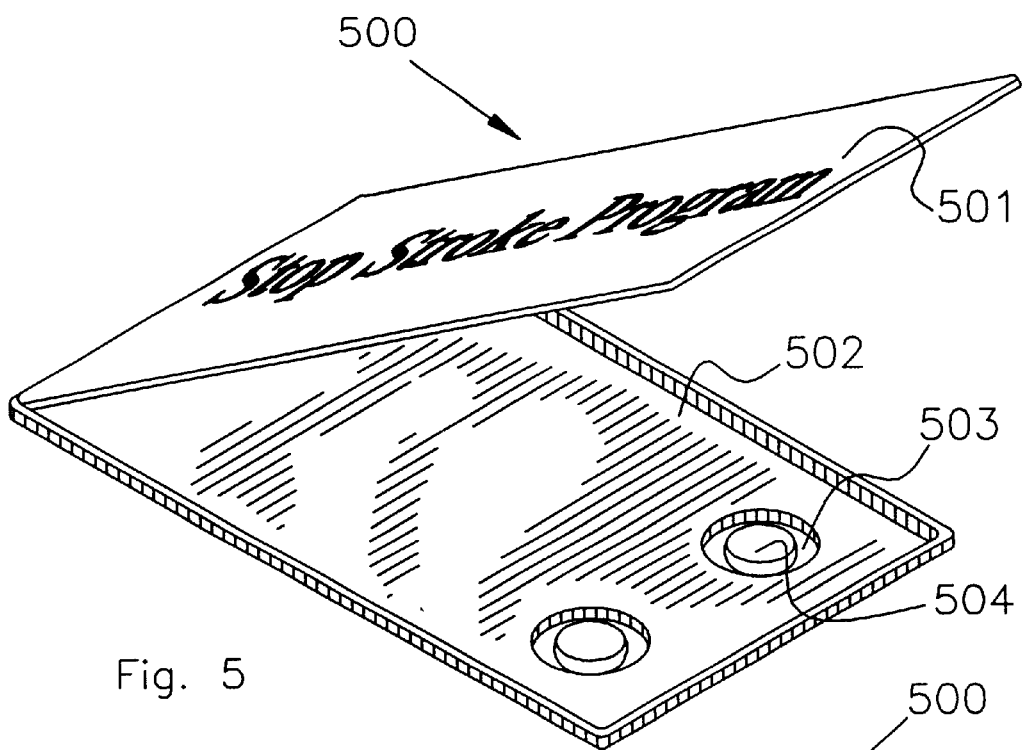
FIG. 5 is an isometric view of a pouch in which a patient may keep diagnostic information concerning stroke symptoms and medication for treatment of stroke.
Figure 6:
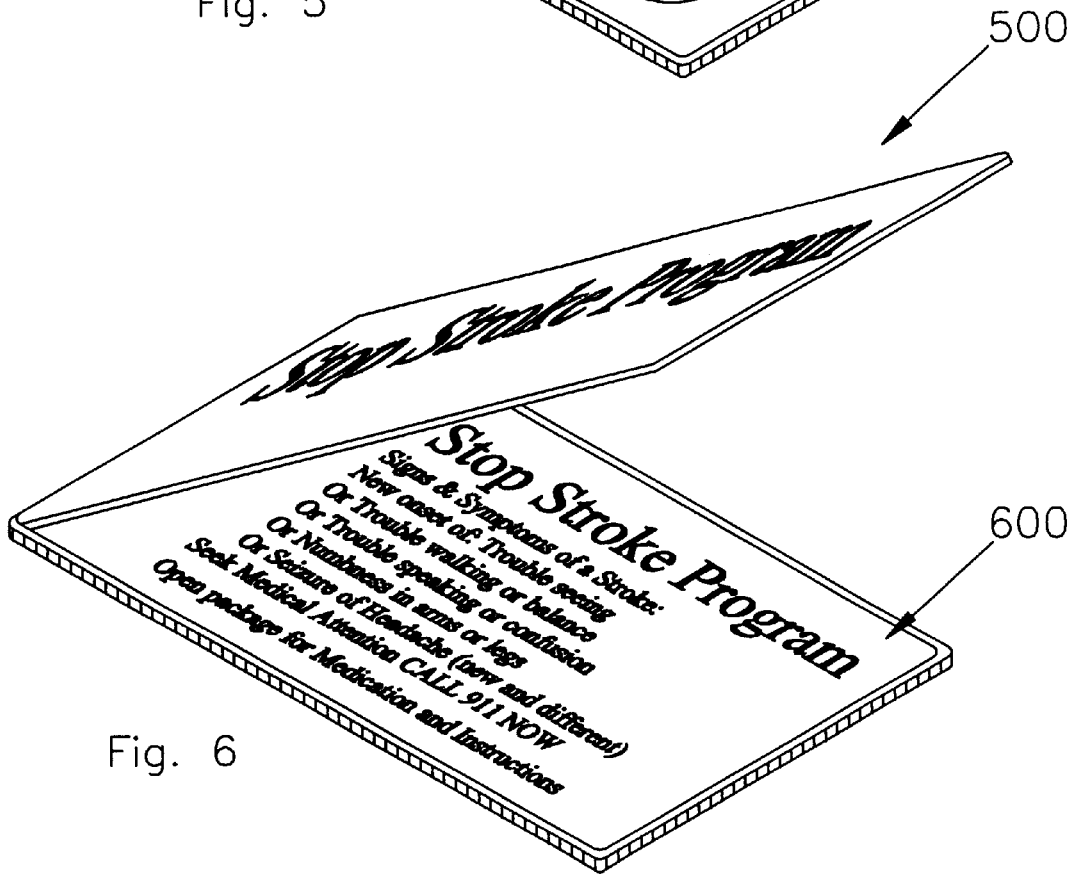
FIG. 6 is a further view of a pouch device in which a patient may keep diagnostic information concerning stroke symptoms and medication for treatment of stroke.

FIGS. 5 and 6 show a pouch 500, constructed from a clear plastic sheet material, and shaped to resemble the shape of a credit card. The pouch 500 consists of a base 502 and a cover 501 which is hinged at one end to to one end of base 500. Two round depressions 503 are formed in base 502. Insert 600 consists of instruction sheets 601, 602, 603 and 604. Sheets 601 and 602 are placed back-to-back and affixed to the inside of cover 501. Sheets 603 and 604 are placed back to back and affixed to the inside of base 502. With the instruction sheets 601–604 thus affixed, four distinct sets of instructions are provided as shown in FIG. 7.

Sheet 601 is readable from the front, of transparent cover 501. Sheet 602 is readable by lifting the hinged cover 501 and opening the pouch 500. Sheet 603 is readable when the cover 501 is opened. The sheet 604 is readable by turning the transparent base 502 over, to view through the back side.

Figure 5A:
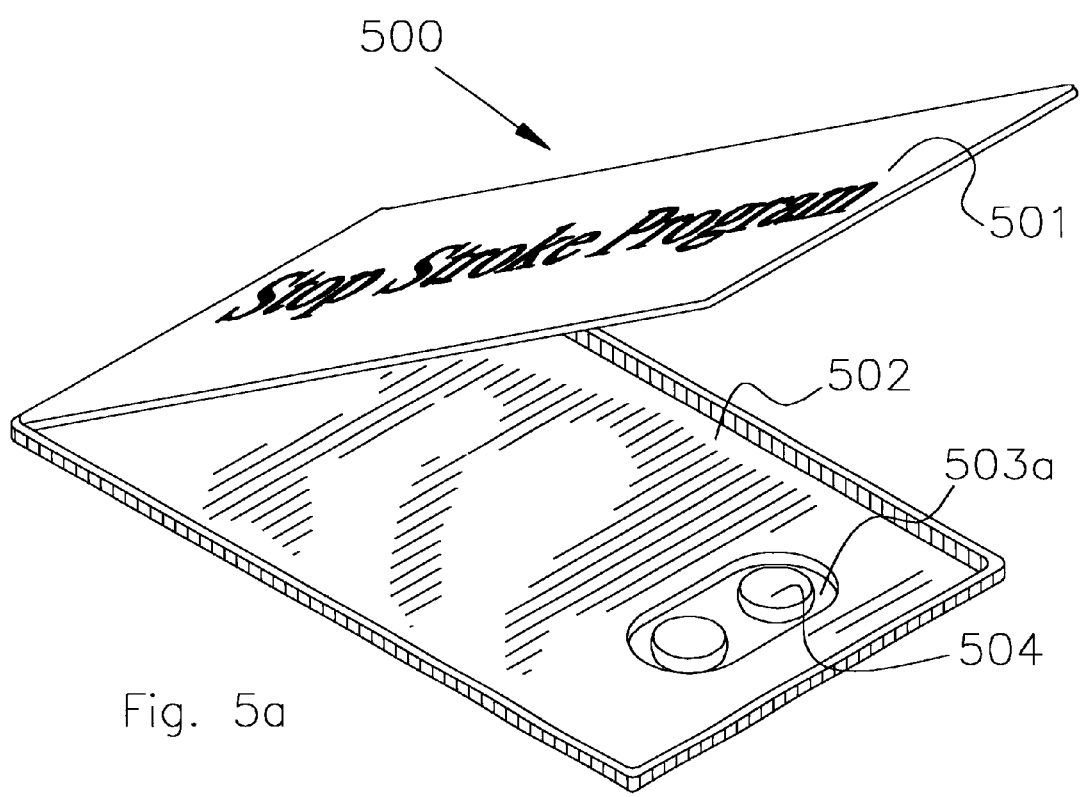
FIG. 5a. is an isometric view of a pouch in which a patient may keep diagnostic information concerning stroke symptoms and medication for treatment of stroke.

Prescription medication, in the form of tablets or capsules 504, provided and held in position by within the depressions 503 or 503a as shown in FIGS. 5 and 5a. The instructions advise the user to take the medications when signs of stroke, as listed on the instruction sheets 601–604 warrant the use of the medication. Use of the medication as instructed by the invention, provides a means for reducing the impairment, disability, and death caused by strokes.

Those skilled in the art will recognize that the method and apparatus of the present invention has many applications, and that the present invention is not limited to the representative examples disclosed herein. Moreover, the scope of the present invention covers conventionally known variations and modifications to the system components described herein, as would be known by those skilled in the art. Although the discussion addresses the acute medical need and provides a program to improve treatment and access for stroke. This program of medical review and provision of direction and immediate treatment to applicable to other acute medical conditions with modification or new written protocols.

What is claimed is:

1. A system for facilitating pre-need and response to the onset of a stroke and the rapid treatment time to minimize the debilitating impact of a stroke, said system comprising:

a one piece, transparent, plastic pouch consisting of a base portion and a cover portion, said base portion having two depressions formed therein, said base portion and said cover portion being hingedly fastened at a first end, a first sheet affixed to the inside of said cover portion, said first sheet having an image of instructions on criteria for a medical review, instructions for identifying signs and symptoms of stroke onset, and instructions on reducing risk factors on a first side, an image of instructions for determining the probability of stroke onset, and instructions for taking medications on a second side, a second sheet being affixed to the inside of said base portion, said second sheet having an image of instructions for requesting an evaluation by emergency medical personnel on a first side, an image of a test for stroke likelihood on a second side, and, a unit of stroke prescription medication inserted in each of said depressions.

* * * * *